(12) United States Patent
Nolla

(10) Patent No.: US 8,317,133 B2
(45) Date of Patent: Nov. 27, 2012

(54) AIRCRAFT FLOOR AND FUSELAGE SUPPLIED WITH SAID FLOOR

(75) Inventor: Guy Nolla, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 775 days.

(21) Appl. No.: 12/041,748

(22) Filed: Mar. 4, 2008

(65) Prior Publication Data

US 2009/0283637 A1  Nov. 19, 2009

(30) Foreign Application Priority Data

Mar. 7, 2007 (FR) ...................................... 07 53679

(51) Int. Cl.
*B64C 1/18* (2006.01)
(52) U.S. Cl. ..................................... 244/119; 244/102 R
(58) Field of Classification Search .............. 244/102 R, 244/118.1, 119, 120, 137.1
See application file for complete search history.

(56) References Cited

U.S. PATENT DOCUMENTS

| | | | |
|---|---|---|---|
| 2,412,778 A | 12/1946 | Kosek | |
| 2,779,558 A * | 1/1957 | Hereil et al. | 244/119 |
| 3,028,130 A * | 4/1962 | Burton | 244/137.1 |
| 5,692,703 A * | 12/1997 | Murphy et al. | 244/102 R |
| 6,273,364 B1 * | 8/2001 | Tizac et al. | 244/100 R |
| 6,554,225 B1 | 4/2003 | Anast et al. | |
| 7,475,850 B2 * | 1/2009 | Vetillard et al. | 244/117 R |
| 7,775,478 B2 * | 8/2010 | Wood et al. | 244/119 |
| 2006/0006284 A1 * | 1/2006 | Vetillard et al. | 244/119 |
| 2006/0231681 A1 * | 10/2006 | Huber et al. | 244/119 |

* cited by examiner

*Primary Examiner* — Joseph W Sanderson
(74) *Attorney, Agent, or Firm* — Perman & Green, LLP

(57) ABSTRACT

An aircraft floor including two lengthwise external beams and at least one pair of cross beams extending between the lengthwise beams, an external end of each cross beam being interlocked to the lengthwise beam. The internal ends of the beams of the pair of the cross beams are connected to each other, where the cross beams are inclined in such a way that the internal ends of the cross beams are directed downward when compared to the horizontal plane of the floor. Moreover, the floor includes self-stiffened panels extending between the cross beams.

12 Claims, 4 Drawing Sheets

STATE OF THE ART

STATE OF THE ART

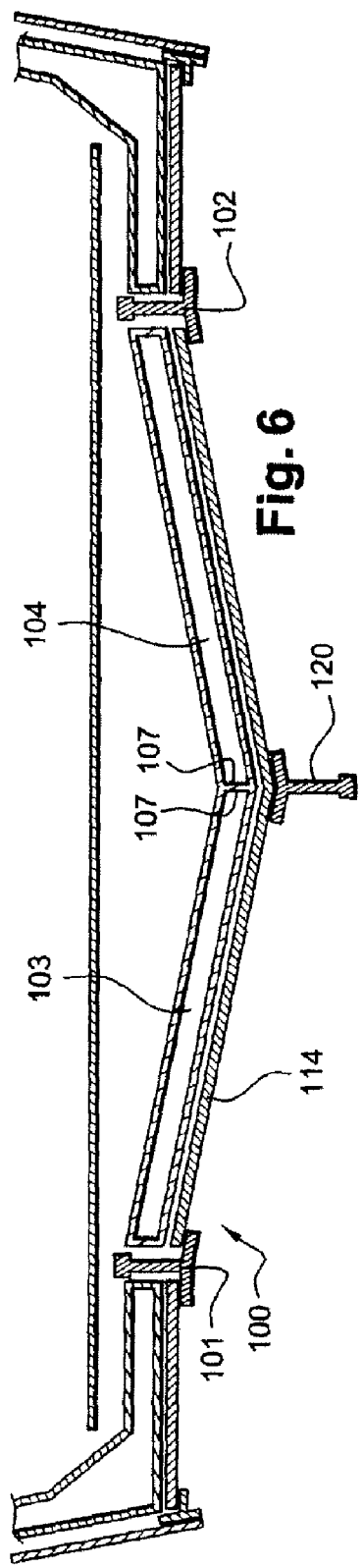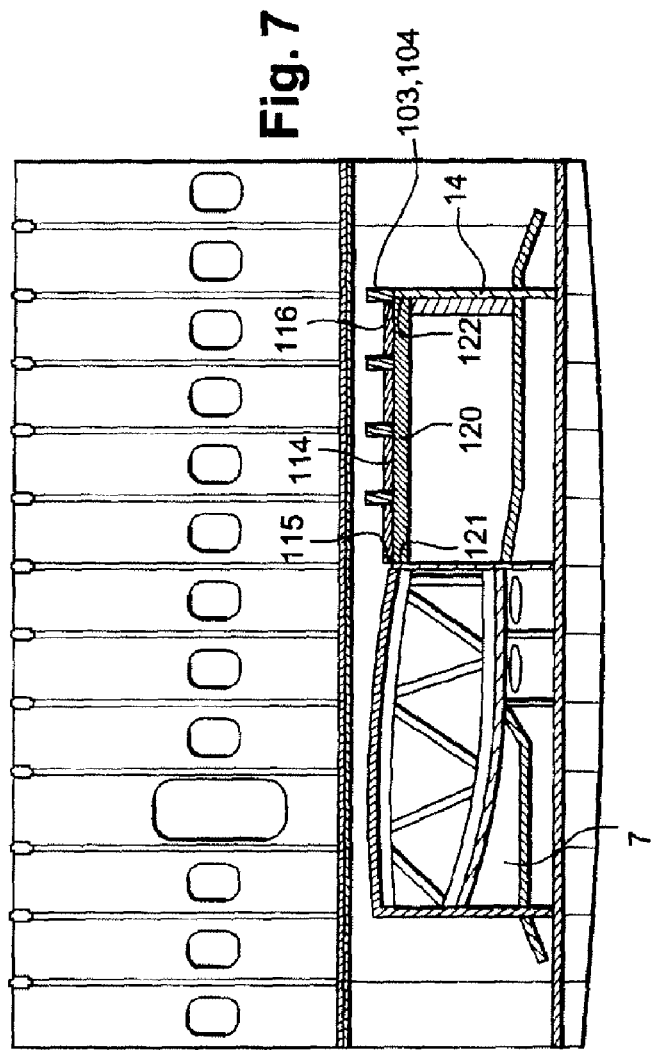

AIRCRAFT FLOOR AND FUSELAGE SUPPLIED WITH SAID FLOOR

CROSS-REFERENCE TO RELATED APPLICATIONS

This application claims priority to and the benefit of French Application No. 07 53679 filed on 7 Mar. 2007, the disclosures of which are incorporated by reference in its entirety.

The aspects of the disclosed embodiments refer to an aircraft floor and an aircraft fuselage containing said floor. More precisely, the aspects of the disclosed embodiments refer to a pressurized floor suitable for adapting itself to deformation of the wing and of the fuselage of an aircraft and the transfer of flight force coming from the back fuselage of the aircraft, towards the wing. The floor according to the aspects of the disclosed embodiments is especially adapted to the central segment of the fuselage at the level of which said floor forms the roof of the landing gear case of said aircraft.

BACKGROUND

As shown in FIGS. 1 and 2 of the state of the art, an aircraft's floor, which is pressurized and deformable, is currently known to be used at the level of the central wing section. The main function of the pressurized floor (1) is to ensure water tightness between the cabin area, situated above the floor, and the outside, and to support force situated above said floor.

Said floor (1) includes a succession of lengthwise beams (2), parallel to the lengthwise axis of the aircraft. The lengthwise beams (2) are fixed on the front end at the center wing partition and on the back end at the vertical watertight bulkhead of the aircraft, Front or back should be understood in relation to the direction of advance of the aircraft into which the floor is intended to be installed. The curved membranes (3), which are flexible and watertight, extend between the lengthwise beams (2) so as to form a pressurized partition. Only the external lengthwise beams, bordering the side walls (4) of the fuselage, are interlocked with the aircraft, and more specifically, said side walls (4) of said fuselage. The side walls (4) of the fuselage are understood to be the right and left walls of said fuselage. The lengthwise beams (2) and the curved membranes (3) are covered by the panels (5) forming the surface to which the passenger seats and/or the articles are fixed. The curved membranes (3) and the center lengthwise beams, i.e., float and extend between the two external lengthwise beams, which allow the floor (1) to adapt to the deformations imposed by the aircraft structure while in flight, while ensuring water tightness between the cabin area and the exterior.

FIG. 3 shows a schematic cross-section view of a segment of the fuselage at the level of the wing partition (7) when the aircraft is in flight.

Under the force of compression and traction which are applied to the wing (6), the underside curve (8) of said wing (6) elongates while the outer curve (9) of said wing shortens, imposing a similar deformation in the center partition of the wing (7) and of the floor (1) situated above said wing partition (7). More precisely, the floor (1) bends.

In addition, the floor (1) undergoes deformations at the back and on its side edges due to lateral flexing and twisting of the back fuselage under the forces resulting from drift. However, the section of aircraft's fuselage provided with a state of the art pressurized floor (1) has a cross section which may be considered an open section (FIG. 2), because of the flexibility of said pressurized floor (1). Such a floor (1) is not suitable for transferring certain forces to which the fuselage is subjected in flight, and in particular horizontal shear flow, which is due to the twisting of the fuselage and the lateral shear force. The transfer of the force is only assured by the side areas of the pressurized floor, attached to the side walls of the fuselage.

The state of the art pressurized floor (1) undergoes repeated duress during the aircraft cycles, which entail fatigue fissures at the level of the curved membranes (3). The fissures on the level of the connections between the curved membranes (3) and the lengthwise beams (2) are propagated and grow larger, requiring the partial or total replacement of the curved membranes (3).

SUMMARY

The disclosed embodiments seek to provide a pressurized floor which is especially adapted to the central segment of fuselage comprising the landing gears, suitable on the one hand for adapting to the deformations imposed by the wing and the fuselage during flight, and on the other hand for allowing the transfer of forces such as horizontal shear flow.

For this, the floor, according to the disclosed embodiments, comprises a self-stiffened flat surface which forms a pressure barrier and cross beams which are tilted downward, from the outside towards the center of the floor. Cross beams should be understood as the beams that extend along the crosswise axis of the floor, corresponding to the crosswise axis of the aircraft in which the floor will be mounted. Self-stiffened surface should be understood as a surface containing stiffeners. Advantageously, the stiffeners extend perpendicularly to the cross beams between which they extend. The cross beams are connected in a flexible manner to the structure of the fuselage in such a way as to follow the deformation during the wing flex of the fuselage's side walls which re connected together. The floor according to the disclosed embodiments is also suitable for gradually transferring the horizontal shear force through the flat self-stiffened surface. Insofar as the pressurized floor according to the disclosed embodiments is able to transfer the force to which it is subjected, it is possible to reduce the side parts of said pressurized floor and the side walls of the fuselage so as to decrease the total mass. In addition, the pressurized floor according to the disclosed embodiments makes it possible to reduce the cost of maintenance since it is no longer necessary to regularly replace the parts of said floor.

Consequently, the object of the disclosed embodiments is a pressurized floor destined to form the roof of the landing gear case of an aircraft including two external lengthwise beams extending along the lengthwise direction of the aircraft and forming the outside edges of the floor, and with cross beams extending along the crosswise direction of the aircraft between the lengthwise beams, an external end of each cross beam being interlocked to the lengthwise beam, characterized in that the internal ends of the beams of a pair of cross beams, opposed at the external ends, are connected to each other, the cross beams being tilted so that the internal ends of the beams of a single pair of cross beams being directed downward when compared to the horizontal plane of the floor, and in that the floor includes self-stiffened panels which extend between the pairs of cross beams.

The self-stiffened panels are made of plates or any other flat surface suitable for resisting buckling during work due to shear or compression. For example, the self-stiffened panels include stiffeners which extend parallel to the lengthwise beams.

Advantageously, the internal ends of the pairs of cross beams lie on a rigid structure which is suitable for collecting the force to which the side panels of the fuselage are subjected in flight and that is gradually transferred by the self-stiffened panels of the floor. For example, the cross beams lie on a vertical wall lengthwise to the horizontal layout of the floor, said wall extending parallel to the external lengthwise beams. In another embodiment, the cross beams may lie on a central lengthwise beam extending along the lengthwise direction of the aircraft.

The lengthwise vertical wall or the central lengthwise beam are advantageously joined forward of the wing partition, behind which the pressurized floor is mounted, in such a way that it follows the deformations of the wing partition and causes a parallel deformation of said floor.

In one specific embodiment of the disclosed embodiments, it is possible to see that the connection between the external end of at least one cross beam and one lengthwise beam is an articulated or 5 flexible joint. Likewise, it is possible to see that the connection between the external lengthwise beams and the side walls of the fuselage is an articulated or flexible joint. Also, the connection between the internal ends of the cross beams is an articulated or flexible joint, suitable for allowing a connection between the pair of cross beams themselves. For example, the connection is articulated via an axis allowing one rotation, i.e., a degree of lengthwise freedom between one element and another. In the case where the materials used to form the beams are sufficiently flexible, it is possible to link them together or to the fuselage wall via a rigid connection, the rotation of which is made possible by the flexibility of the material itself. In this case, it is also possible, as regards the cross beams, to use one single V-shaped cross beam instead of a pair of tilted beams.

The purpose of disclosed embodiments is also an aircraft fuselage supplied with at least one landing gear case and including a floor according to the disclosed embodiments destined to form the roof of the landing gear case.

Advantageously, a front end of the floor lies on the central wing partition of said fuselage while one back end of said floor rests on the vertical watertight bulkhead of the fuselage, which follows the curvature of the fuselage wall.

According to the embodiments of the disclosed embodiments, it is possible to provide all or part of the following supplementary characteristics:

Front end of the floor rests on the center wing partition of said fuselage;

Back end of the floor rests on the vertical watertight bulkhead said fuselage;

Each of the external lengthwise beams of the floor are connected to a side wall of the fuselage which they border, by an articulated joint;

Front end of the vertical lengthwise wall is interlocked to the back end of the characteristic wing partition;

Front end of the center lengthwise beam is interlocked to the back end of the wing partition;

Front end of the center lengthwise beam is interlocked to the vertical watertight bulkhead;

Center lengthwise beam is linked to the lower fuselage wall via at least one vertical rod.

The disclosed embodiments will be better understood by reading the following description and by examining the figures that accompany it. These are presented as an indication and by no means set a limit on the disclosed embodiments. The Figures show:

BRIEF DESCRIPTION OF THE DRAWINGS

FIG. 6: A schematic cross-section view of a floor according to the second embodiment of the disclosed embodiments;

FIG. 7: A schematic lengthwise cross-section view of a floor according to the second embodiment of the disclosed embodiments;

DETAILED DESCRIPTION

Figure 1:
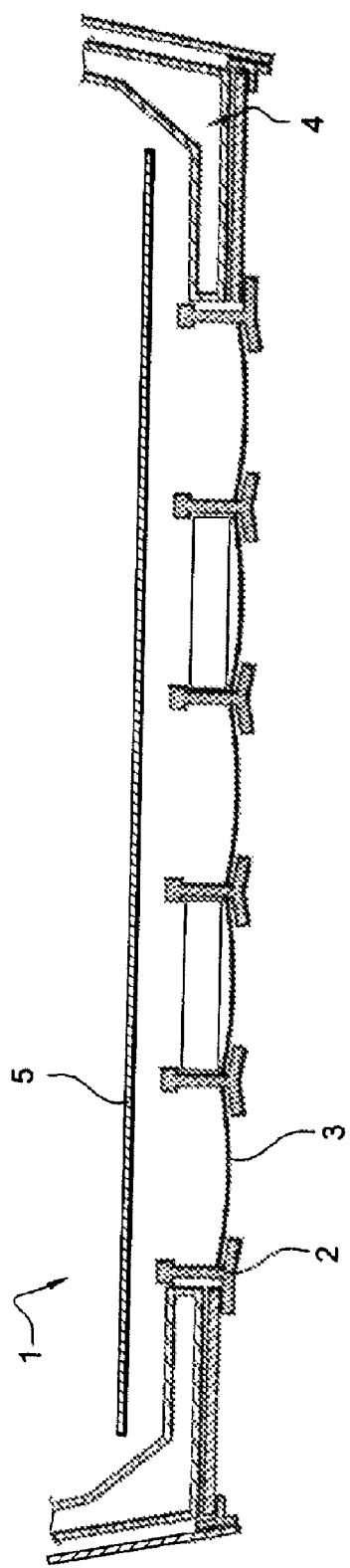
FIG. 1: A schematic cross-section view of the aircraft fuselage floor at the level of the wing partition, according to the state of the art.
Figure 2:
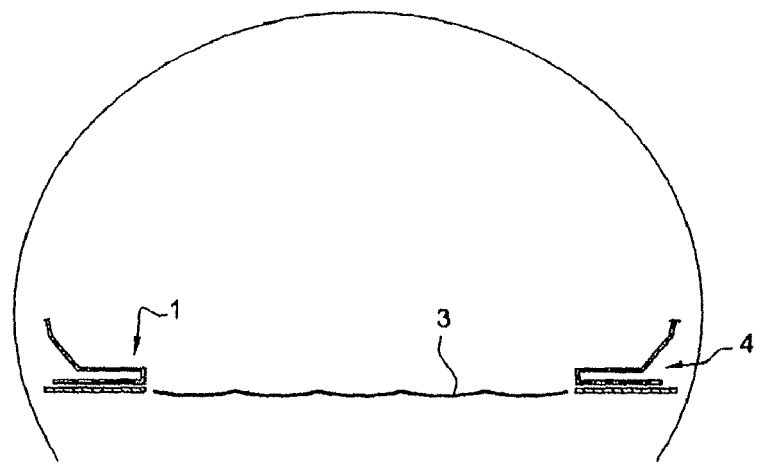
FIG. 2: A schematic cross-section view of the aircraft fuselage at the level of the wing partition, according to the state of the art already described.
Figure 3:
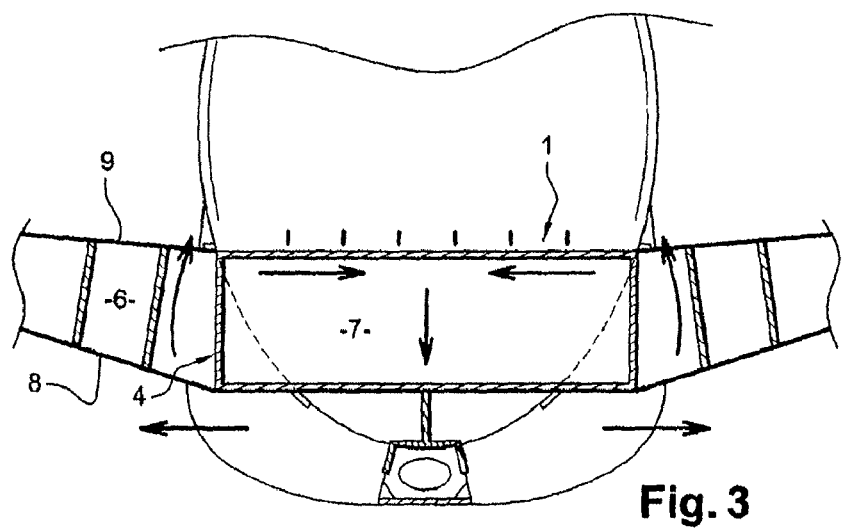
FIG. 3: A schematic cross-section view of the aircraft fuselage at the level of the wing partition, showing the deformations and forces to which the wing and the floor are subjected.
Figure 4:
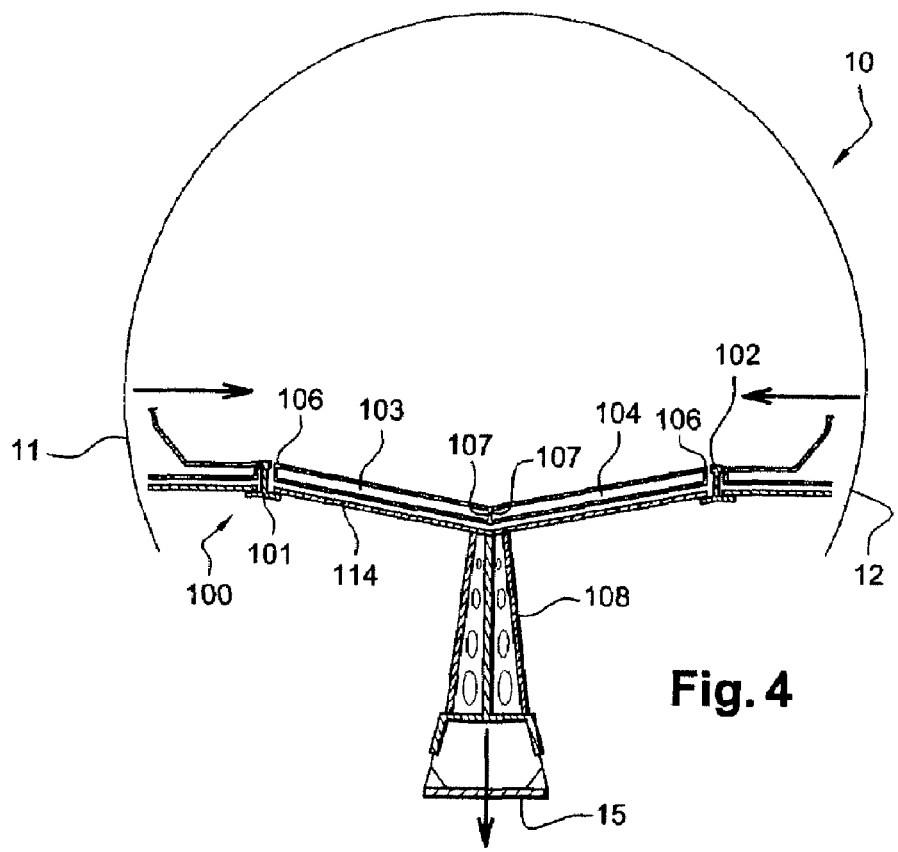
FIG. 4: A schematic cross-section view of a fuselage supplied with a floor according to the first embodiment of the disclosed embodiments.
Figure 5:
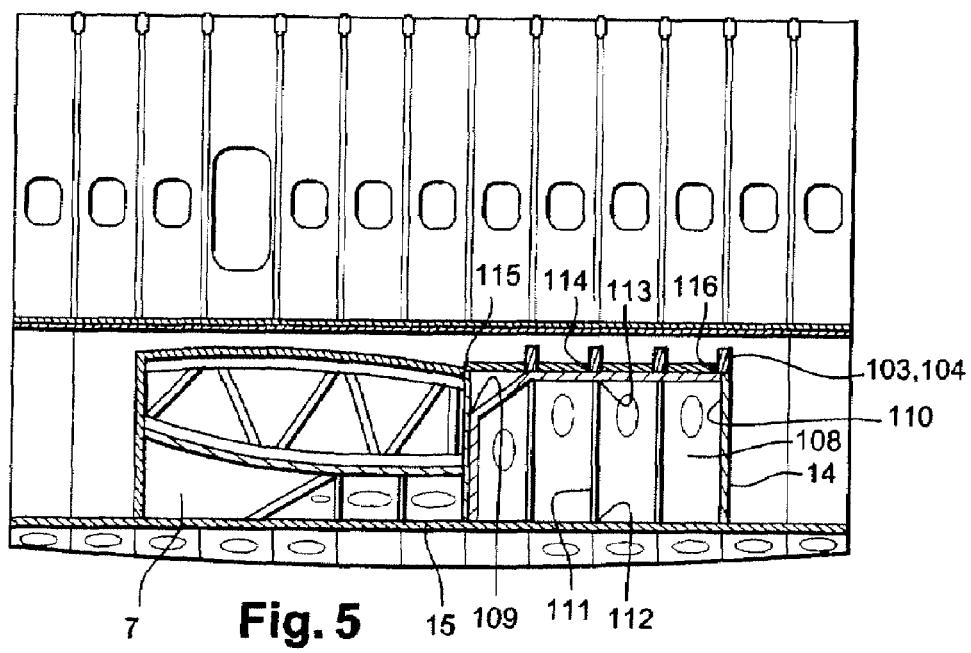
FIG. 5: A lengthwise cross-section view of a floor according to the first embodiment of the disclosed embodiments.

In FIGS. 4 and 5 the first embodiment of the floor (100) according to the disclosed embodiments is shown, respectively, in cross-section and lengthwise cross-section.

The floor (100) includes two lengthwise external beams (101 and 102) extending parallel to the lengthwise axis of the segment of fuselage. Each external lengthwise beam (101, 102) extends along a side wall (11 or 12) of the fuselage (10), to which it is fixed by a flexible or articulated connection. The pairs of cross beams (103, 104) are placed between the external lengthwise beams (101, 102) (a single pair of cross beams is visible in FIG. 4). The pairs of cross beams (103, 104) are placed in such a way that they are tilted downward. More specifically, the external end (106) of each cross beam (103, 104) is interlocked with an opposite lengthwise beam (101, 30 102), while the internal ends (107) of the cross beams of the same pair are interlocked with each other. External end should be understood to mean the end directed towards the outside of the floor, as opposed to the internal end directed towards the center of the floor. The pairs of beams (103, 104) are inclined in such a way that the internal end (107) is situated underneath the external end (106) as compared to the horizontal plane of the floor (100). The pair of cross beams (103, 104) forms therefore a V in which the point, formed by the internal ends (107), rests upon a solid structure on the fuselage.

Furthermore, as in the state of the art, the floor (100) according to the disclosed embodiments continues over the sides of the fuselage. Also, a front end (115) of the floor (100) lies on the central wing partition (7) of said fuselage (10) while one back end (116) of said floor (100) rests on the vertical watertight bulkhead of the fuselage (14).

In the example shown in FIGS. 4 and 5, the internal end (107) of the cross beams (103, 104) rests on the vertical lengthwise wall (108), extending parallel to the lengthwise axis of the fuselage (10). The vertical wall (108) is fixed, by its front end (109), on the back longer on of the wing partition (107) of the aircraft, while the back end (110) is fixed to the vertical watertight bulkhead (14) of said aircraft. The lengthwise vertical wall (108) is (as an example) fixed to the wing partition (7) and at the vertical watertight bulkhead (14) by an angle or T connection.

The vertical lengthwise wall (108) includes a succession of vertical columns (111). The lower end (112) of each vertical column (111) is interlocked with the lower wall (15) of the fuselage (10) of the aircraft, while the upper end (113) is interlocked with the internal ends (107) of the cross beams (103, 104). Thus the cross beams (103, 104) rest on a solid structure, connected to the wall of the fuselage. When the wing partition (13) deforms, the lengthwise vertical wall (108) is drawn downward by the lower wall (15) of said fuselage (10), leading to the pairs of cross beams (103, 104) that are drawn together.

In FIG. 5, the lengthwise cross-section view shows four cross beams (103, 104) belonging to four pairs of adjacent cross beams (103, 104). The pairs of cross beams (103, 104) are placed parallel to each other. Of course, it is possible to supply the floor (100) with more or fewer pairs of cross beams (103, 104) in function of the length of the floor (100). The external ends (106) of the pairs of cross beams (103, 104) are connected to the external lengthwise beams (101, 102) in such a way as to allow a degree of freedom sufficient to pivot and allow bending of said pairs of cross beams (103, 104) following the deformations of the fuselage (10).

Similarly, the external ends (107) of the cross beams (103, 104) are connected to the external lengthwise beams (108, 102) in such a way as to allow a degree of freedom sufficient to pivot and allow bending of said pairs of cross beams (103, 104) following the deformations of the fuselage (10). The shortening of the floor during the connection of the side walls (11, 12) of the fuselage (10) is therefore possible by connecting the pairs of cross beams (103, 104) to each other and by lowering the internal ends (107) of said cross beams (103, 104) (103, 104) in the direction of the lower wall (15) of the fuselage (10). The deformation of the floor follows the deformation of the wing and the fuselage (10). In other words, the deformation of the floor (100) is compatible with the deformation of the wing.

In FIGS. 6 and 7 the second embodiment of the floor (100) according to the disclosed embodiments is shown.

The pairs of cross beams (103, 104) rest at the level of their internal ends (107) on a central lengthwise beam (120). The central lengthwise beam (120) extends parallel to the external lengthwise beams (101 and 102) and parallel to the lengthwise axis of the aircraft. Thus, the central lengthwise beam (120) extends throughout the length of the floor (100) substituting the vertical lengthwise wall in the first embodiment described above. Length should be understood as the dimension of the floor (100) extending parallel to the lengthwise axis of the aircraft. The front end (121) of the lengthwise central beam (120) is fixed to the wing partition (7) while the back end (122) is fixed to the watertight bulkhead (14). The lengthwise beam (120) which is connected to the wing partition (7) and to the vertical watertight bulkhead (14), follows the deformation of the wing and pulls the cross beams (103, 104) downward, when the side walls (11, 12) of the fuselage (10) draw together.

In the specific embodiment of the floor (100) according to the disclosed embodiments, it is possible, following the length of the floor (100), to maintain the central lengthwise beam (120) via the vertical or inclined rod (not shown). Rods extend between the lower wall (15) of the fuselage (10) and the center lengthwise beam (120).

The floor (100) according to the disclosed embodiments includes plates (114) suitable for flexing with the pressure force of the floor (100). The plates (114) extend between the cross beams (103, 104), so as to form a pressure barrier between the outside and the part of the fuselage situated above the floor (100). The plates (114) are, for example, in sheets and include stiffeners extending perpendicular to the cross beams (103, 104).

The stiffeners may be placed under the plates (114), in such a way as to pass under the beams. It is also possible to allow the stiffeners to end at the level of the cross beams (103, 104).

The plates (114) and the center lengthwise beam (120) or the center lengthwise wall (108) allow the floor structure to close and consequently allow the transfer of the shear flow gradually, via said plates (114), after the side walls (11, 12) of the fuselage (10) in the direction of the center of the floor (100).

The invention claimed is:

1. A floor forming a roof of a landing gear case of an aircraft, the floor comprising:
    two external lengthwise beams extending along a lengthwise direction of the floor and forming outside edges of the floor;
    a plurality of cross beams extending along a crosswise direction between the lengthwise beams, each cross beam having an external end and an internal end,
        wherein the external end of each cross beam is interlocked to one of the lengthwise beams,
        wherein the internal ends of the cross beams are connected to each other in pairs, and
        wherein the cross beams are tilted so that the internal ends of at least one of the pairs of cross beams are directed downward when compared to the horizontal plane of the floor; and the internal ends of the cross beams are connected to a first end of a solid vertical structure using an articulated joint, the solid vertical structure having a second end connected to a lower wall of a fuselage of the aircraft in order that deformation of the floor follows deformation of a wing of the aircraft and the fuselage; and
    the floor further comprising self-stiffened panels which extend between the pairs of cross beams.

2. The floor according to claim 1, further comprising plates extending between the cross beams to create a pressure barrier.

3. The floor according to claim 1, wherein the self-stiffened panels include stiffeners extending parallel to the lengthwise beams.

4. The floor according to claim 1, wherein the connection between the external end of at least one cross beam and one lengthwise beam is an articulated or flexible joint.

5. The floor according to claim 1, wherein the solid vertical structure comprises a lengthwise vertical wall extending parallel to the lengthwise beams.

6. The floor according to claim 5, wherein the lengthwise vertical wall comprises a plurality of vertical columns extending under the cross beams in relation to the horizontal plane of the floor.

7. The floor according to claim 1, wherein the solid vertical structure comprises a lengthwise center beam extending parallel to the external lengthwise beams.

8. An aircraft fuselage supplied with at least one landing gear case and including a floor according to claim 1 forming the roof of the landing gear case.

9. The aircraft fuselage according to claim 8, wherein a front end of the floor rests on a center wing partition of said fuselage.

10. The aircraft fuselage according to claim 8, wherein a back end of the floor rests on a vertical watertight bulkhead.

11. The aircraft fuselage according to claim 8, wherein the external lengthwise beams of the floor are each connected to a side wall of the fuselage by an articulated joint.

12. The aircraft fuselage according to claim 8, wherein the solid vertical structure is connected to the lower wall of the fuselage via at least one vertical or inclined rod.

* * * * *